R. L. LLOYD.
SEPARATION OF MATERIALS BY GRAVITY.
APPLICATION FILED FEB. 21, 1916.

1,310,998.

Patented July 22, 1919.

Inventor
R. L. Lloyd
By his Attorneys
Kerr, Page, Cooper & Hayward

UNITED STATES PATENT OFFICE.

RICHARD LEWIS LLOYD, OF NEW YORK, N. Y., ASSIGNOR TO DWIGHT & LLOYD METALLURGICAL COMPANY, OF NEW YORK, N. Y., A CORPORATION OF NEW JERSEY.

SEPARATION OF MATERIALS BY GRAVITY.

1,310,998.  Specification of Letters Patent.  Patented July 22, 1919.

Application filed February 21, 1916. Serial No. 79,595.

*To all whom it may concern:*

Be it known that I, RICHARD LEWIS LLOYD, a citizen of the United States, residing at city of New York, county of Kings, and State of New York, have invented certain new and useful Improvements in the Separation of Materials by Gravity, of which the following is a full, clear, and exact description.

This invention relates to the separation of "values" from slag in a suitable vessel or vessels, or receptacles, such as one or more forehearths into which the molten contents of a blast furnace are discharged. The slag, being lighter, floats on top and flows out of the forehearth through an outlet opening or spout above the bottom, while the values, heavier than the slag, are supposed to sink below the level of the slag outlet and thus be retained in the vessel until removed by other means. As is well known to metallurgical engineers, the separation by this method, even under the best conditions, is never perfect, some of the values being always carried away with the slag in a mechanically suspended condition or chemically combined with the slag. An obvious mode of decreasing the loss in the case of mechanically suspended values, is to increase the size of the forehearth, so as to give more time for the values to settle out before the slag reaches the outlet; but this expedient has practical limitations, for if the forehearth is too large the increased viscosity of the slag, due to loss of temperature, nullifies the advantages that otherwise might accrue; and if the values are chemically combined with the slag, large settling area is of no advantage.

It is accordingly the object of my present invention to provide improved means and method whereby less of the values will be carried out with the slag either mechanically or chemically and, consequently, more will be retained in the forehearth or settling vessel, and to provide means and method of obtaining chemical reactions in the settling vessel or vessels which will save values that are chemically combined with the slag into savable shape or condition.

In carrying out the invention in the preferred manner the desired results are obtained by compelling the incoming material (the slag and the values, more or less intermingled) to pass a considerable distance below the surface of the slag in the vessel, after which it is allowed to rise and proceed toward the slag outlet, the result being that the length of the path of the slag through the forehearth is increased without material loss of temperature, thereby giving the values more time to sink out of the slag. Preferably, also, the incoming stream of material is caused to descend into intimate association with, and be thoroughly commingled with, and to pass or be filtered through, the layer of metal, or matte, or regulus, or whatever form the values may take, which values may be, and usually are, themselves reagents with respect to the values that are chemically combined in the slag, so that more or less of the incoming values may coalesce with, and hence be retained in, such layer, or be chemically acted upon by such layer and thus made capable of being saved. Moreover, the incoming slag and values may be caused to pass through a layer of material consisting of one or more reagents (other than the said layer of metal or values) capable of acting chemically, thereby utilizing the forehearth as a means for such other chemical treatment of the material as may be desirable to put the values in savable condition.

In practising the invention in what at the present time I believe to be the most convenient and effective way, the forehearth or other settling receptacle is provided with a well having its top open and extending above the molten slag while its bottom, which is provided with one or more openings, extends some distance below the surface, preferably down into and through the layer of matte or metal. The fluid material delivered to the forehearth is discharged in this well, and hence the slag can escape from the well only by passing down through the segregated portion of slag contained in said well, after which it can rise and flow on to the outlet. The values descending in the well are thus brought into contact with the body or layer of matte, which has accumulated in the forehearth, so as to be comminuted and thoroughly and intimately associated with the matte or metal of said layer or body, and hence much of the values that might otherwise remain in the slag are caused to coalesce with, and be retained in, the accumulated matte. For convenience, this may be described as a mechanical action or effect. After leaving the well the slag flows toward the outlet in a path or paths which are, in general, inclined, thus giving values which are still held in the current of slag a better opportunity to sink out of the same. If it is desired to treat the incoming material chemically the necessary reagent or reagents, such as sulfids, pyritous ores, oxids, carbonates, carbon, etc., capable of floating on the slag, or above the accumulated layer of matte, are placed in the well, so that the slag and values discharged into the well will flow through the floating reagent or reagents and hence pass or filter through and be brought into intimate association therewith. As already stated, the matte, regulus, speiss, etc., often, and indeed ordinarily, are themselves reagents with respect to values chemically combined in the slag; and hence the slag being compelled to pass through these reagents also, is further cleansed. Fresh reagent or reagents are supplied from time to time as may be necessary through the open top of the well. The reagents themselves, gradually smelting, are also carried downward with the molten materials from the furnace and further react with the slag and values therein contained, both while showering down through the slag and afterward when they remain as a molten layer through which the slag must pass and come into intimate contact with.

The procedure thus briefly outlined can be conveniently carried out by the apparatus illustrated somewhat diagrammatically in the accompanying drawing, in which—

Figure 1:
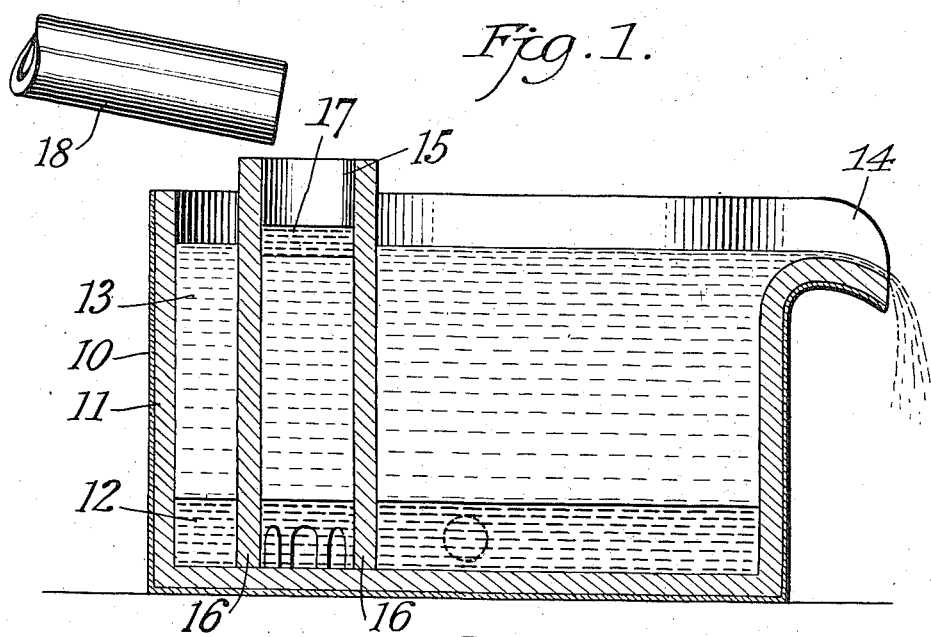
Figure 1 is a vertical section of the forehearth showing the receiving well in place.

The forehearth or settling receptacle shown is of the usual type, consisting of a sheet metal shell 10 provided with a refractory lining 11 composed of material which is chemically inert to the substances that come in contact with it. A layer of matte, or metal, or other form of values, is indicated at 12, and floating thereon is the slag 13, which flows out of the vessel through the discharge spout 14. The well 15, Fig. 1, is in the form of a hollow-cylinder, composed of or protected by suitable refractory and inert material, resting on the bottom of the forehearth and having openings 16 in its lower end, said openings extending preferably well below the surface of a layer of matte of normal or usual thickness in the bottom of the settling receptacle. 17 designates a layer of material composed of one or more reagents floating on the slag in the well 15. It will now be seen that any material discharged into the well by the spout 18 (usually leading directly from the blast furnace, not shown) must first pass through the reagents 17, and thence descend to the bottom of the well and pass through the layer of matte 12 before it can proceed to the outlet 14. In passing through the layer 17 the material is subjected to the action of the reagents composing or contained in said layer, and in passing through the layer 12 the latter seizes and holds values that might otherwise be retained by the slag, as well as such values as have been prepared for saving by the action at layer 17. The slag flows from the bottom of the well to the outlet spout 14 in paths which are, in general, inclined, the degree of inclination depending at least in part upon the rate of outflow from the outlet spout, which rate is in turn dependent upon the rate of delivery of the slag and values to the settling receptacle.

It is well known that for the cleanest separation the composition of the slag should be uniform; and it is also well known that such uniformity has never been attained and seldom, if ever, approximated. In fact the stream from the inlet spout continually varies in its quantitative composition. In my invention, however, the incoming materials are confined for a time to the receiving well and in descending through the same are churned up, as it were, and mixed together. The result is that the composition, and hence the consistency, of the slag in the forehearth is on the whole more nearly uniform than is the case where the well is not used, thus markedly facilitating the separation of the values by gravity.

At starting, the settling vessel and the well are preferably empty, and the layers 12, 13, are established simply by accumulation of the respective materials, but of course they may be established by depositing already separated values and slag in the vessel.

Figure 2:
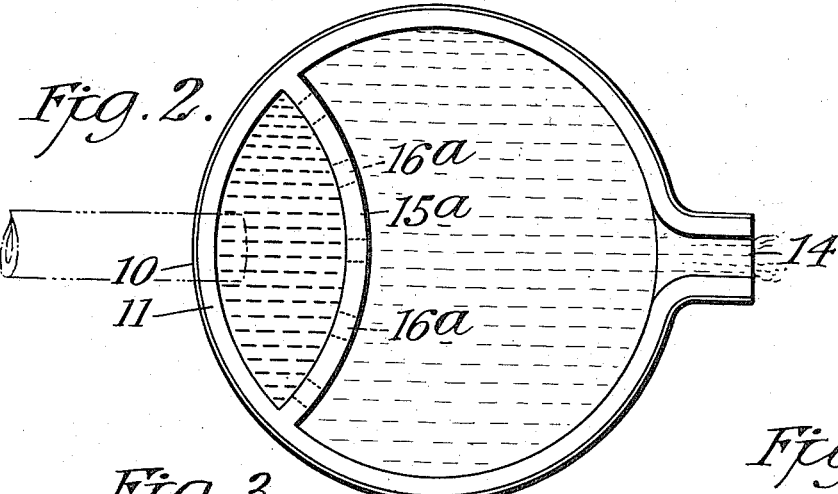
Fig. 2 is a plan view of a modification, in which the well is provided by a transverse partition or wall.

The well may be of other types than the one shown in Fig. 1. For example it may be formed by a partition, straight, angular or curved, across the vessel. Such a partition is shown at 15$^a$, Fig. 2, provided with outlet openings at its bottom indicated by dotted lines at 16$^a$. If the separation obtained in one receptacle is not clean enough, two or more vessels may be used in series, the slag from the first flowing into the second, and from the second into the third, etc. Such an arrangement is illustrated diagrammatically in Fig. 3, in which three settling vessels 19, 20, 21, are shown, with discharge spouts 14$^a$, 14$^b$, 14$^c$ and wells 15$^b$, 15$^c$, 15$^d$. The tandem or series arrangement has an important advantage in that it permits the use of different reagents separately or in succession, as may be desirable in the case of slag containing values of two or more different kinds. For example, the first well may contain reagents capable of reacting effectively with one kind of values, and the second well may contain reagents which will react with another kind of values, and so on.

Figures 3, 4:
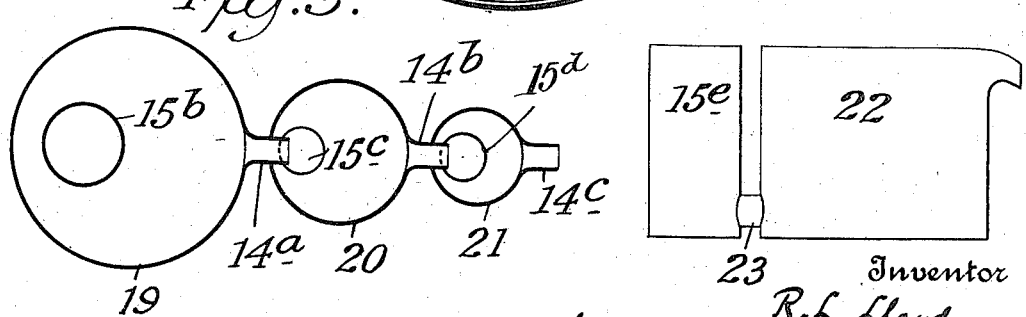
Fig. 3 is a diagrammatic plan view showing several forehearths in series.
Fig. 4 is a vertical section showing a modification.

In the apparatus shown in Fig. 4 the well 15ᵉ is entirely outside the settling vessel 22, but is connected to the latter at the bottom by means of a pipe or other suitable conduit 23. It is clear that this type may be used in the series arrangement. In such arrangements the apparatus may be all of the same type, or part like that shown in Fig. 3 and part like that shown in Fig. 4.

The effectiveness of the invention has been fully demonstrated in practice, the losses by incomplete separation being decreased fully one-sixth.

The invention is believed to find its chief utility in blast-furnace and analogous work, wherein values or other materials are to be separated from a slag or similar medium made liquid by heat, but it can be used to advantage in other situations where different materials, at least one of which is liquid, are to be separated by gravity.

It is to be understood that the invention is not limited to the apparatus and procedure herein specifically described, but can be practised in other ways without departure from its spirit.

I claim:

1. The method of chemically treating one or more of a plurality of commingled materials and effecting their separation by gravity, comprising providing a settling vessel having a well extending downwardly and open to the vessel at its lower end; establishing in the lower part of the vessel a layer or body of the heavier of the materials and above the same a layer or body of the lighter material or materials; establishing in the well a floating layer or body containing one or more reagents; and delivering into the well above the reagent layer the materials to be treated and separated.

2. The method of treating material composed of commingled values and slag to effect their separation, comprising establishing in a suitable vessel a lower layer or body of values, above the same an upper or main body or layer of slag, and a segregated portion of said main body or layer containing one or more reagents; passing a stream of mingled values and slag into intimate association with and through said reagents and with the values underlying said segregated portion of slag, and permitting the stream to rise into the main body or layer of slag; and allowing the said main body of slag to overflow the vessel.

3. The method of treating material composed of mingled values and slag, comprising establishing in a suitable vessel a lower layer or body of values, and an upper main layer or body and an upper segregated layer or body of slag floating on the said layer or body of values; establishing in the segregated layer or body a floating layer or body containing one or more reagents; delivering mingled slag and values into the segregated layer or body whereby the mingled slag and values are caused to pass through the said reagents and the lower layer of values and bodies resulting from smelting of the reagents and be subjected to the chemical and mechanical effects thereof; and permitting the main layer or body of slag to overflow the vessel.

4. The method of treating material composed of mingled slag and values, comprising establishing a lower layer or body of values and main and segregated layers or bodies of slag floating on the layer or body of values; said segregated layer or body containing one or more reagents; passing mingled slag and values through the segregated layer or body of slag and the layer or body of values into the main layer or body of slag, whereby said mingled values and slag are subjected to the chemical and mechanical effects of the reagent or reagents and the layer or body of values; passing material from the upper portion of the main layer or body through a second segregated layer or body of slag, containing one or more reagents and floating on a second lower layer or body of values, into a second main layer or body of slag; and discharging material from the upper portion of said second main layer or body.

5. The method of treating material composed of mingled slag and values to effect their separation, the method comprising establishing in suitable vessels a plurality of lower layers or bodies of values, main and segregated layers or bodies of slag floating on the lower layers, and layers or bodies of reagents floating on said segregated layers or bodies of slag, passing the said material through the first layer or body of reagents and first layer or body of slag into the layer or body of values and thence into the first main layer or body of slag, and passing material from the first main layer or body in like manner through the remaining layers or bodies in succession.

In testimony whereof I hereunto affix my signature.

RICHARD LEWIS LLOYD.